March 30, 1965 H. C. GLESMANN 3,175,663
CLUTCH
Filed Feb. 4, 1963 3 Sheets-Sheet 2

INVENTOR.
Herbert C. Glesmann
BY
Julian Schachner
Atty.

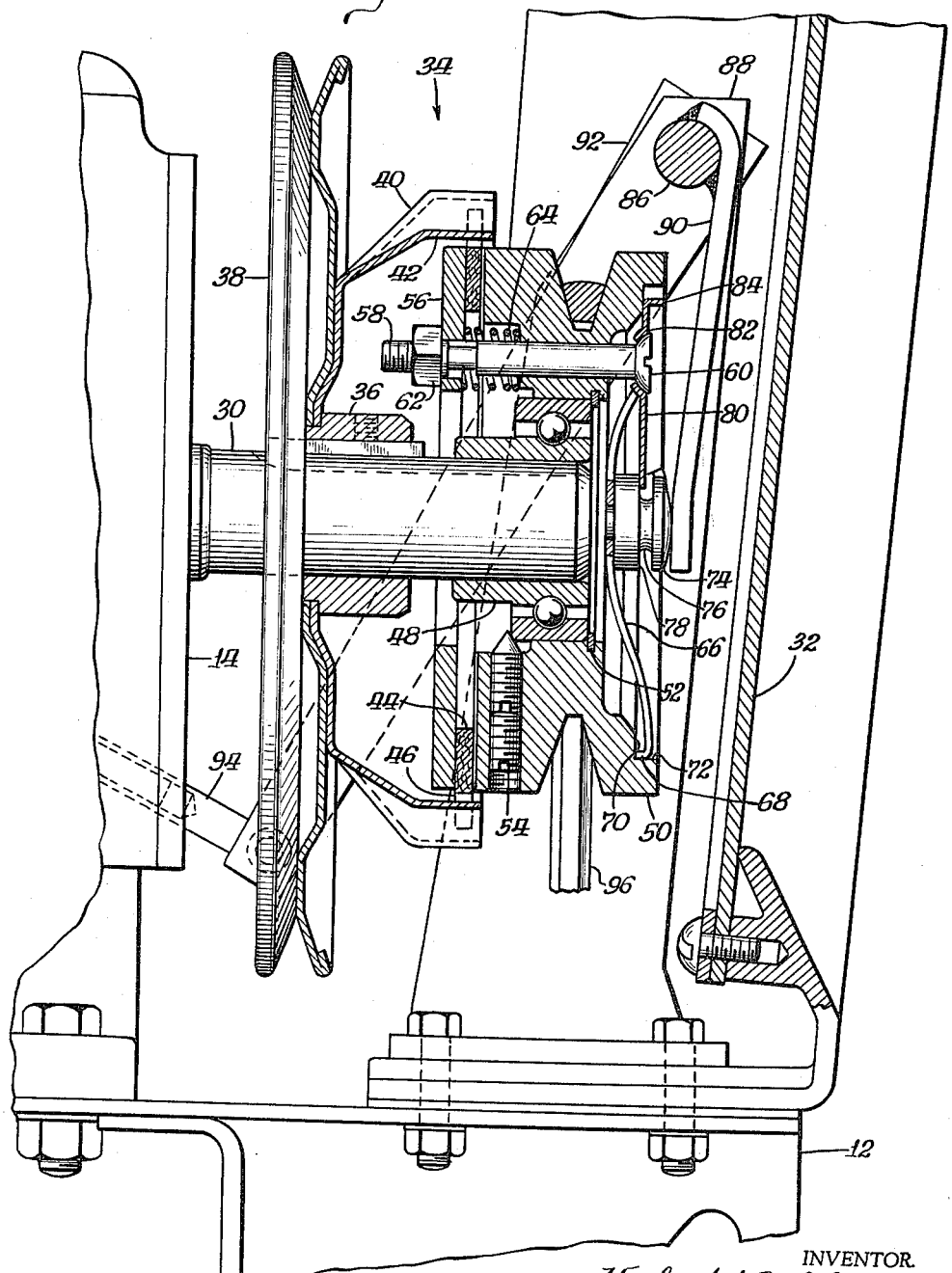

United States Patent Office

3,175,663
Patented Mar. 30, 1965

3,175,663
CLUTCH
Herbert C. Glesmann, Naperville, Ill., assignor to International Harvester Company, Chicago, Ill., a corporation of New Jersey
Filed Feb. 4, 1963, Ser. No. 255,968
1 Claim. (Cl. 192—68)

This invention relates generally to clutches. More particularly it relates to friction clutches of the type in which a driving connection is established by engagement of axially separable clutch elements provided with complemental engaging surfaces. Clutches of this nature are of quite general application, but are particularly suitable for use in automotive vehicles in order to provide a source of transmitting power to auxiliary equipment.

An object of this invention is the provision of a friction clutch embodying a compact structure, which is capable of transmitting relatively high torque and which will operate over long periods of time with little or no servicing.

Another object of this invention is the provision of a clutch including actuating means so oriented relative to its associated clutching means that frictional contact is considerably reduced and thus wearing qualities are greatly enhanced.

Another object of this invention is the provision of a clutch mechanism involving biasing and actuating means unaffected by centrifugal force.

These and other objects and advantages of this invention will become apparent to one skilled in the art upon a perusal of the accompanying specification in conjunction with the drawings in which:

FIGURE 3 is a side elevational sectional view taken along the line 3—3 of FIGURE 2 and showing the clutch in detail.

Figure 1:
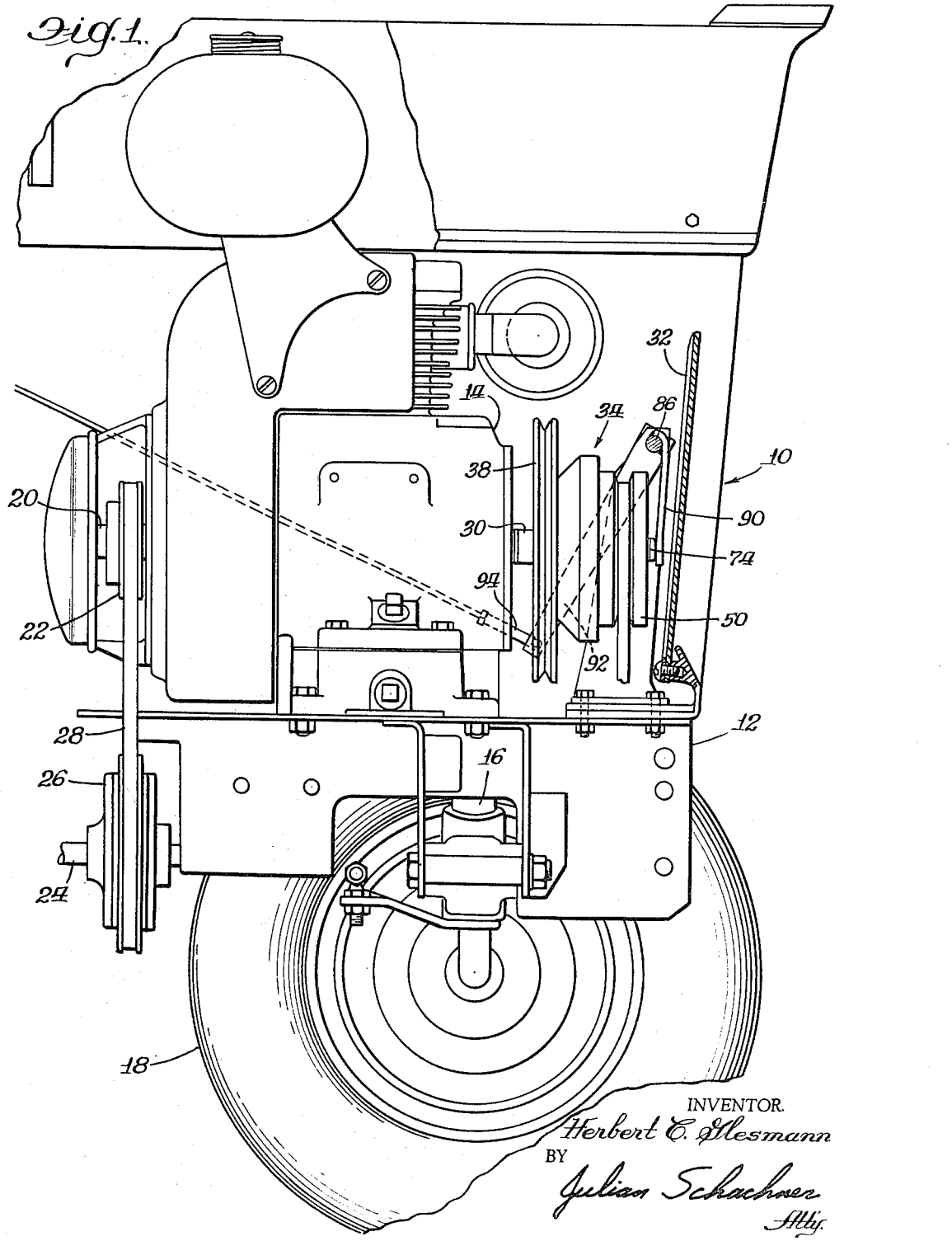
FIGURE 1 is a fragmentary view of a typical tractor incorporating the clutch.

Turning now in particular to FIGURE 1, the tractor 10 will be seen to include a frame 12. Supported on the frame is a conventional engine 14, and extending from the frame is a conventional wheel supporting bolster and axle assembly 16 on which wheels 18 are mounted.

The engine 14 may be provided with a rearwardly extending drive shaft 20 to which is secured a drive pulley 22. An additional drive shaft 24 may be suitably mounted on the frame 12 and may support a complementary pulley 26 driven by means of the belt 28. It is to be understood, however, that the belt driving assembly shown is by way of example only and that other direct or indirect drive means may be provided.

In many instances auxiliary power is taken from shaft 20 for driving associated equipment. In lieu thereof or in addition thereto an additional source of auxiliary power may be provided through a compact clutching assembly where space limitations are critical. To this end the drive shaft 30 extends forwardly from the engine 14. The front grille 32 limits the space within which the clutch assembly must be mounted to function and accordingly, a compact clutch assembly 34 is mounted on the drive shaft 30 behind the grille 32.

Figure 2:
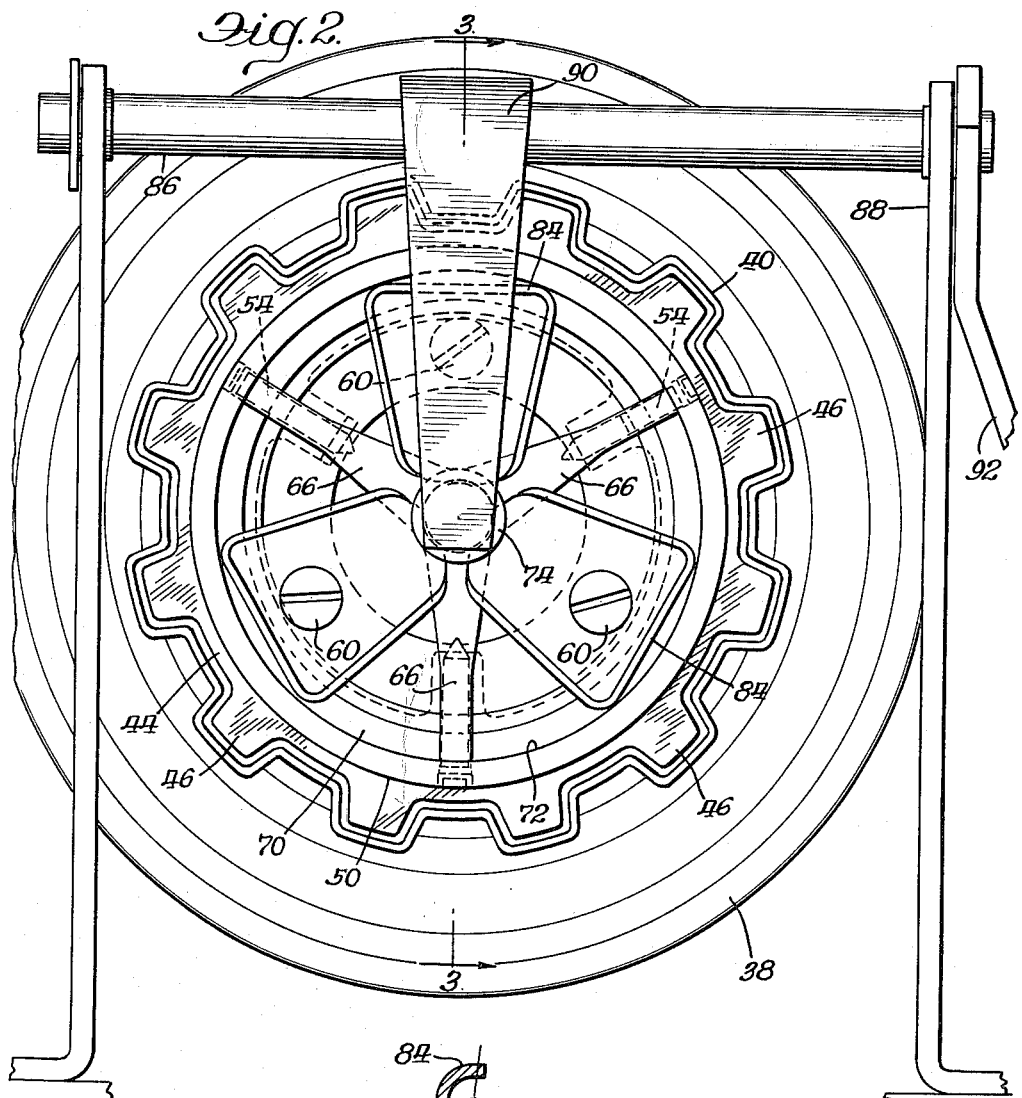
FIGURE 2 is an end view showing the specific structure of the actuating mechanism and friction clutch mounting mechanism.

Turning now more specifically to FIGURES 2 and 3, it will be seen that the clutch assembly 34 includes a hub 36 which is splined, keyed or otherwise suitably secured to drive shaft 30 for rotation therewith. Mounted on hub 36 is the generator-starter driven pulley 38 from which extends forwardly a cup member 40 having a plurality of circumferentially spaced, inwardly directed internal teeth 42.

An annular friction disk 44 is provided with a plurality of circumferentially spaced, outwardly directed external teeth 46 which engage the teeth 42 to mount friction disk 44 within cup 40 in such a manner as to prevent relative rotation therebetween while allowing limited relative longitudinal sliding.

A bearing 48 is secured to the forward end of drive shaft 30 in a conventional manner. A pulley 50 is mounted on the outer race of bearing 48 by means of a snap ring 52 and a plurality of threaded wedge type elements 54. Pulley 50 is freely rotatable with the outer race of bearing 48 relative to the inner race and drive shaft 30.

A pressure plate 56 is mounted within cup member 40 and adjacent to friction disk 44 so as to be engageable therewith. A plurality of mounting bolts 58, preferably provided with spherical heads 60, extend through pulley 50 and pressure plate 56 and are secured by nuts 62 with friction disk 44 therebetween. About each bolt 58 is a biasing spring 64 acting upon pressure plate 56 and pulley 50 so as to bias these elements apart and provide freedom to friction disk 44.

A spider spring 66 with a plurality of arms having turned end portions 68 is mounted in an axial groove 70 to abut the wall 72 fashioned interiorly of the front face of pulley 50. Abutment of wall 72 at all times by end portions 68 of spring 66 insures that spring 66 will be oriented coaxially with drive shaft 30 regardless of the flexure of the spring.

A button 74 is mounted centrally of spring 66 so as to be coaxial therewith and with drive shaft 30. Button 74 is provided with an annular groove 76 including forward face 78. A plurality of force multiplying levers 80 having spherical seat portions 82 and rounded outer end portions 84 are mounted with their inner end portions within groove 76 of button 74 and their outer end portions engaging groove 70 and abutting face 72 of pulley 50.

A shaft 86 is mounted for rotation within supporting sub-frame 88 which in turn is secured to frame 12. Actuating arm 90 is welded or otherwise suitably secured to shaft 86 for rotation therewith and engages button 74 so as to move it axially upon rotation of shaft 86. Operating member 92 extends from shaft 86 and through linkage 94 is movable from the operator's position so as to rotate shaft 86, thereby selectively engaging or disengaging the clutch assembly 34. A V-belt 96 serves to direct power through clutch assembly 34 to suitable auxiliary equipment.

Figure 4:
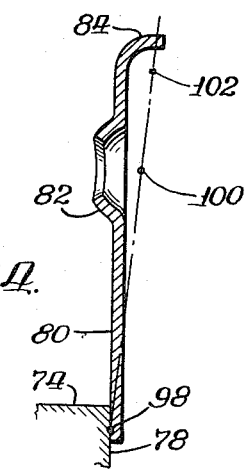
FIGURE 4 is a detailed view of the force multiplying levers incorporated as part of the actuating mechanism.

Turning now to FIGURE 4, it will be seen that each force multiplying lever 80 contacts the forward face 78 formed on button 74 at a point 98. The center of rotation of spherical head 60 of bolt 58 within spherical seat portion 82 is designated at 100 while the center of rotation of the rounded outer end portion 84 of lever 80, which is determined by engagement with groove 70 and face 72, is shown at 102. It has been found that wearing of the elements is greatly reduced when contact point 98 and rotational centers 100 and 102 are linear. Furthermore, wear is reduced when levers 80 travel approximately equal distances on both sides of the position perpendicular to the axis of drive shaft 30 in moving between the clutch engaged and disengaged positions.

Spider spring 66 normally biases button 74 forwardly or to the right as shown in FIGURE 3. Face 78, engaged by the inner portion of levers 80 at point 98, forces the levers to pivot about point 102 due to engagement of outer end portions 84 with groove 70 and face 72 of pulley 50. This movement carries bolts 58 and pressure plate 56 forwardly so as to engage friction disk 44 with pulley 50. Power is thus transmitted from drive shaft 30 through cup 40, friction disk 44 and pulley 50 to drive the auxiliary equipment.

Clutch assembly 34 may be disengaged by manual actuation of link 90 which acts through operator 92 to rotate shaft 86 and actuating arm 90. This forces button 74 rearwardly or to the left as shown in FIGURE 3 along the axis of drive shaft 30. Button 74 carries with it spider spring 66, the outer curved end portions 68 of which keep it centered axially of drive shaft 30 by engaging groove 70 and face 72 of pulley 50 at all times. This movement of button 74 allows springs 64 to separate pressure plate 56 from pulley 50, thereby freeing friction disk 44 and disengaging pulley 50 from drive shaft 30. Obviously, the opposite movement of linkage 94 by the operator serves to cause engagement of clutch assembly 34 through the action of spring 66.

Thus, it will be seen that a compact clutch assembly has been provided which insures proper orientation of the elements in all working positions thereof regardless of centrifugal force and further, provides for a minimum of wearing thereby allowing maximum utility and freedom from servicing difficulties.

It is to be understood that the foregoing description and the accompanying drawings have been given only by way of illustration and example. Changes in the elements, rearrangement of parts and substitution of equivalents all of which would be obvious to those skilled in the art are considered to be within the scope of this invention.

I claim:

In a clutch mechanism, the combination comprising a rotatable shaft, a cup member mounted on said shaft for rotation therewith and having a plurality of teeth; a friction disk having a plurality of teeth cooperable with said teeth of said cup member so as to prevent relative rotation but not relative sliding therebetween; a pulley mounted on said shaft adjacent an end thereof for rotation relative thereto and having an annular groove therein and a surface engageable with said friction disk; a pressure plate engageable with said friction disk for sliding said friction disk relative to said cup member into frictional engagement with said pulley surface so as to prevent rotation of said pulley relative to said shaft; a relatively weak spring biasing said pressure plate out of engagement with said friction disk; a button having an annular notch therein; a relatively strong Belleville spring having a central portion mounting said button beyond and coaxial with said end of said shaft and a plurality of radially extending portions engaging said groove; a plurality of levers each having an inner end portion engaging said notch, a rounded outer end portion rotatably slidably engaging said groove, and an intermediate seat portion; and a plurality of connectors having head portions rotatably engaged by respective seat portions of said levers and shaft portions engaging said pressure plate; the point of engagement of said inner end portion and the centers of rotation of said seat portion and said outer end portion of each of said levers defining a straight line.

References Cited in the file of this patent

UNITED STATES PATENTS

| 822,727 | 6/06 | Duryea | 192—69 |
|---|---|---|---|
| 2,026,945 | 1/36 | Lane. | |
| 2,714,437 | 8/55 | Spase. | |
| 2,801,722 | 8/57 | Spase. | |

FOREIGN PATENTS

| 1,139,998 | 2/57 | France. |
|---|---|---|
| 955,202 | 12/56 | Germany. |

DAVID J. WILLIAMOWSKY, *Primary Examiner.*